United States Patent
Mehta et al.

(10) Patent No.: US 10,607,271 B1
(45) Date of Patent: Mar. 31, 2020

(54) SEARCH PLATFORM WITH DATA DRIVEN SEARCH RELEVANCY MANAGEMENT

(71) Applicant: WALGREEN CO., Deerfield, IL (US)

(72) Inventors: Chintan Mehta, Killdeer, IL (US); Jason Fei, Long Grove, IL (US); Swarup Pogalur, Deerfield, IL (US); Kristin Marx, Seattle, WA (US); Syed Y. Ali, Chicago, IL (US); Jie Hu, Lake Zurich, IL (US); Sujatha Satish, Long Grove, IL (US)

(73) Assignee: WALGREEN CO., Deerfield, IL (US)

( * ) Notice: Subject to any disclaimer, the term of this patent is extended or adjusted under 35 U.S.C. 154(b) by 232 days.

(21) Appl. No.: 15/460,798

(22) Filed: Mar. 16, 2017

(51) Int. Cl.
   G06Q 30/06 (2012.01)
   G06F 16/13 (2019.01)
   G06F 16/14 (2019.01)
   G06F 16/2457 (2019.01)

(52) U.S. Cl.
   CPC ....... *G06Q 30/0625* (2013.01); *G06F 16/134* (2019.01); *G06F 16/148* (2019.01); *G06F 16/156* (2019.01); *G06F 16/24578* (2019.01); *G06Q 30/0639* (2013.01)

(58) Field of Classification Search
   CPC . G06Q 30/0625; G06F 16/134; G06F 16/148; G06F 16/156; G06F 16/2443; G06F 16/2428; G06F 16/24578
   USPC .............................................. 705/26.62, 26.1
   See application file for complete search history.

(56) References Cited

U.S. PATENT DOCUMENTS

| | | | |
|---|---|---|---|
| 9,881,066 B1 * | 1/2018 | Yousaf | G06F 16/248 |
| 2003/0069880 A1 * | 4/2003 | Harrison | G06F 16/3334 |
| 2005/0086212 A1 * | 4/2005 | Hughes | G06F 16/951 |
| 2009/0006207 A1 * | 1/2009 | Datar | G06Q 30/02 705/14.54 |
| 2015/0081653 A1 * | 3/2015 | Hsu | G06F 3/04883 707/706 |
| 2015/0278902 A1 * | 10/2015 | Warren | G06Q 30/0623 705/26.61 |
| 2016/0170814 A1 * | 6/2016 | Li | G06F 9/542 719/318 |
| 2017/0185653 A1 * | 6/2017 | Huang | G06F 16/2468 |

(Continued)

FOREIGN PATENT DOCUMENTS

WO   WO 2016197852 A1 * 12/2016 ............. G06F 17/30

*Primary Examiner* — Yogesh C Garg
(74) *Attorney, Agent, or Firm* — Marshall, Gerstein & Borun LLP; Randall G. Rueth

(57) ABSTRACT

Techniques are disclosed to facilitate an improved data query system for an elastic search cluster. An ingestion framework receives data from several sources, indexes this data, which is then stored as indexed data files across several data nodes in the elastic search cluster. The system also utilizes a query template management system, which matches a query to a particular query template based upon various parameters. The matched query template specifies one or more relevancy factors that are applied to the query to cause the elastic search cluster to perform the search in a specific manner. In this way, the query templates allow for search results to be tailored in a highly customized manner based upon the desired characteristics that are used to match, or trigger, the specific query template. The relevancy factors can also be dynamically updated to improve the search results over time.

20 Claims, 8 Drawing Sheets

(56) References Cited

U.S. PATENT DOCUMENTS

2017/0199875 A1* 7/2017 Nevrekar .......... G06F 16/24578
2017/0364520 A1* 12/2017 Venkataraman ...... G06F 17/212

* cited by examiner

| HOME | WORKBENCH | COMPARE INSTANCES | USER |

| | |
|---|---|
| HOME | |
| TEMPLATES | > |
| COMPARE INSTANCES | |
| WORKBENCH | > |

⊕ IMPORT INSTANCE ⊕ ADD NEW INSTANCE

| TEMPLATE | INSTANCE NAME | STATUS | CREATED ON | LAST UPDATED | PUBLISHED BY |
|---|---|---|---|---|---|
| SEARCH CONFIGURATION | 123 | INACTIVE | 4 JAN 2017 | 4 JAN 2017 | USER |
| SEARCH CONFIGURATION | ARYAROUND2 | INACTIVE | 2 JAN 2017 | 4 JAN 2017 | USER |
| SEARCH CONFIGURATION | ARYA_REGRESSION | INACTIVE | 29 DEC 2016 | 29 DEC 2016 | USER |
| SEARCH CONFIGURATION | BOGO | INACTIVE | 6 DEC 2016 | 4 JAN 2017 | USER |
| SEARCH CONFIGURATION | BOGO | INACTIVE | 4 JAN 2017 | 4 JAN 2017 | USER |
| SEARCH CONFIGURATION | BOGO | INACTIVE | 6 DEC 2016 | 6 DEC 2016 | USER |
| SEARCH CONFIGURATION | COMPARE INSTANCES | ACTIVE | 3 NOV 2016 | 3 NOV 2016 | USER |
| SEARCH CONFIGURATION | COMPAREINSTANCE_TEST | ACTIVE | 3 NOV 2016 | 29 DEC 2016 | USER |
| SEARCH CONFIGURATION | DEFECT | ACTIVE | 2 JAN 2017 | 2 JAN 2017 | USER |
| SEARCH CONFIGURATION | EXAMPLEINSTANCE | INACTIVE | 2 JAN 2017 | 3 JAN 2017 | USER |
| SEARCH CONFIGURATION | GWP | INACTIVE | 4 JAN 2017 | 4 JAN 2017 | USER |
| SEARCH CONFIGURATION | OMNITURE RELEVANCE | ACTIVE | 4 NOV 2016 | 14 NOV 2016 | USER |

*FIG. 5*

| HOME | WORKBENCH | COMPARE INSTANCES | USER |

⊕ ADD NEW KEYWORD

| SEARCH KEYWORD | TOP PRODUCT | STATUS | CREATED ON | LAST UPDATED | PUBLISHED BY | NO OF PRODUCTS ALTERED |
|---|---|---|---|---|---|---|
| BABY TOYS | PROD0823627, DISCOVER & PLAY PIANO | INACTIVE | 2016-12-28 08:45:34 | 2017-01-03 23:28:29 | USER | 2 |
| OIL | PROD6154839, HAND CREAM FROM VIRGIN OLIVE OIL | INACTIVE | 2016-12-12 08:44:50 | 2017-01-03 23:27:55 | USER | 2 |
| BABY CARE | PROD8212848, INFANT TEETHING TOOTHBRUSH | INACTIVE | 2016-12-02 00:05:40 | 2017-01-03 19:16:28 | USER | 6 |
| LIPSTICK | PROD6171514, ROLL-ON LIPSTICK FIXATIVE | ACTIVE | 2016-12-31 20:13:53 | 2016-12-31 20:13:53 | USER | 1 |
| TOYS | PROD6277711, WINKEL BABY RATTLE & TEETHER, AGES 0-12 MONTHS | INACTIVE | 2016-12-28 06:57:40 | 2016-12-24 10:58:11 | USER | 2 |
| VITAMIN C | PROD6263311, VITAMIN C DIETARY SUPPLEMENT ORANGE | INACTIVE | 2016-12-13 03:58:58 | 2016-12-20 16:08:16 | USER | 4 |
| FISH OIL | PROD6305161, FISH OIL 1000mg LEMON | ACTIVE | 2016-12-06 09:40:59 | 2016-12-06 09:40:59 | USER | 3 |
| SHA | PROD6177462, SHAMPOO, COLORFINITY | INACTIVE | 2016-12-05 00:24:45 | 2016-12-05 00:24:45 | USER | 2 |
| BABY POWDER | PROD6109560, BABY BEE DUSTING POWDER | INACTIVE | 2016-12-02 16:35:17 | 2016-12-02 16:35:17 | USER | 4 |
| MILK | PROD8038263, WHOLE PINT | INACTIVE | 2016-12-01 13:25:07 | 2016-12-02 16:27:13 | USER | 4 |

HOME
TEMPLATES
COMPARE INSTANCES
WORKBENCH

*FIG. 8*

SEARCH PLATFORM WITH DATA DRIVEN SEARCH RELEVANCY MANAGEMENT

TECHNICAL FIELD

The present disclosure relates generally to a search management platform and, more particularly, to customizing and tailoring search results provided by an elastic search cluster.

BACKGROUND

Shopping experiences for retailers has become increasingly done online via computers and mobile devices such as smartphones. To meet this demand, many retailers offer their products for sale online with other useful information such as store locations, hours, and inventory data. Thus, it is common for people to search online for a particular store location or product. For example, when searching for a particular product, a user may type in a query such as a text string in an attempt to find a matching product. Typically, the retailer's website platform receives this search query, executes the query to find several matches within a database, and returns the search results to the user so they can be viewed.

However, traditional search platforms provide the same search results for the same search queries, regardless of whether the returned search results may be relevant to each particular user. In other words, traditional searches simply match search queries to a database regardless of when the search is performed and who is doing the searching, and do not take other parameters into account that may influence the relevancy of the returned search results. As a result, typical search results provided for one user may be more or less relevant than those same search results for another user. Because more relevant search results are more likely to result in conversions, i.e., search queries that result in the customer actually making a purchase, current search processes are ineffective.

SUMMARY

In an embodiment, an elastic search cluster is implemented to provide data-driven relevancy searches, which can be improved over time by further analysis of various parameters. Elastic search clusters have several advantages over traditional database searches. For instance, elastic search clusters may be implemented to facilitate the organization of data from a large number of data sources, and are particularly well-suited for applications involving the organization of "big-data," in which data that is typically unorganized is indexed and stored across several nodes to facilitate data searches. In other words, elastic search clusters provide advantages for a large number of clients searching a large pool of data given their ability to provide scalable searching, to facilitate near real-time searching, and to support multitenancy.

As will be further discussed below, elastic search clusters typically have a distributed architecture, meaning that data file indexes can be divided into shards, with each shard having zero or more replicas. Each node hosts one or more shards and acts as a coordinator to delegate operations to the correct shard(s), with rebalancing and routing being performed automatically. Related data is often stored in the same data file index, which consists of one or more primary shards, and zero or more replica shards.

In an embodiment, an elastic search architecture is utilized to receive data from multiple data sources and to process this data via an ingestion framework. As part of the data processing operations, the ingestion framework may create several data file indexes, which are stored across several nodes of the elastic search cluster. Again, each data file index may include data of a specific and related type, with the data file indexes being analogous to individual searchable databases. For example, the ingestion framework may associate a data file index with various products sold by the retailer or with different categories of products. In such a case, the data file index may include all products sold by the retailer or a narrower set of products contained in a searchable category. These categories may be the same as, for example, those offered as navigation tools via the retailer's website or are otherwise used by the retailer's search platform.

For example, one data file index may include data related to grocery products, with another data file index including data related to personal care products, beauty products, etc. Thus, depending on the type of retailer and the specific types of goods sold, the elastic search cluster may store any suitable number of data file indexes, with each data file index containing data associated with a category of specific products sold by that retailer. For instance, a pharmacy may utilize the elastic search cluster to store a data file index including data related to pharmaceutical and/or over-the-counter drug products. Moreover, the elastic search cluster may store several data file indexes, with each one containing a subset of this data organized by type (e.g., allergy medication, pain relief medications, cold and flu medication, etc.)

In an embodiment, the data received by the ingestion framework may also be utilized to create data file indexes for purposes other than searching. For example, data stored in one or more data file indexes may be collected from various data sources and utilized to modify how current and future searches are performed. To facilitate this functionality, embodiments also include a core search engine that is configured to apply various relevancy factors to a received search query, which instruct the elastic search cluster how each search is to be performed. The relevancy factors may be chosen based upon any suitable type of information, such as current promotions, whether certain items are on sale, whether the retailer is hosting a current campaign for the searched product, whether any products are out of stock, etc. In this way, embodiments include "tuning" search queries such that the search results shown to each user can be tailored in a way to produce more relevant search results.

To do so, embodiments include the core search engine storing several query templates, with each query search template including a specific set of relevancy factors. The core search engine matches an incoming search query to one of these query templates based upon a set of rules, conditions, and/or logic. For example, certain query templates may be assigned to incoming search queries based upon the location of the client device from which the search query originated, the type of client device, the user-segment of the user associated with the client device, the user's previous search history and/or results, etc.

Once the search query is matched to the query template, the relevancy factors associated with that query template may be applied to the initial search parameters associated with the received search query to provide relevancy search parameters. The elastic search cluster may then search the appropriate data file index in accordance with the relevancy search parameters instead of the initial search parameters to provide more relevant search results. In other words, without the core search engine, a search query would be handled directly in accordance with the initial search parameters associated with the received search query. The core search engine, however, functions to "intercept" incoming search queries and to "layer" the initial search parameters with additional instructions that result in more relevant search results being returned to the user based upon the particular query template to which that user's search query was matched.

Moreover, embodiments include user's manually, automatically, or semi-automatically generating new query templates and/or modifying existing query templates in a continuous and dynamic manner. In doing so, the embodiments allow for future searches to be improved based upon previous search results or to obtain some desired set of search results. In other words, embodiments of the relevancy-driven data searching platform discussed herein allow for query templates to be changed over time, new query templates to be created, and/or the set of rules, conditions, and/or logic to be updated that allows incoming search queries to be matched to one of these query templates. And because embodiments of the search platform implements a query template-based structure, changes to the query templates and matching logic may be executed with little or no engineering coding changes being made to the overall search platform.

Still further, embodiments also include a web-based or other suitable relevancy management portal configured to allow the aforementioned creation and modification of query templates as well as facilitating other functions. Among these additional functions is the ability to "sandbox" the execution of searches using different query templates and to view search result outcomes before these changes are implemented or "go live." The relevancy portal tool also allows users to perform comparisons between searched performed using different query templates and then select the query template that provides the most relevant or otherwise favorable search results. The relevancy manager portal may also function to provide feedback regarding a history of search results for particular searches and query templates, allowing users to further fine tune searching parameters based on specific promotions, seasonal items that may go on sale, items that are out of stock, etc. In this way, subsequent searches may provide results that are weighted more heavily than others based upon the user's desired relevancy goals or current marketing strategy.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

FIG. 5 is an example screenshot 500 of a relevancy management home screen, in accordance with an embodiment;

FIG. 8 is an example screenshot 800 of a relevancy management target search page, in accordance with an embodiment.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '_____' is hereby defined to mean. . . ." or a similar sentence, there is no intent to limit the meaning of that term, either expressly or by implication, beyond its plain or ordinary meaning, and such term should not be interpreted to be limited in scope based on any statement made in any section of this patent application.

Figure 1:
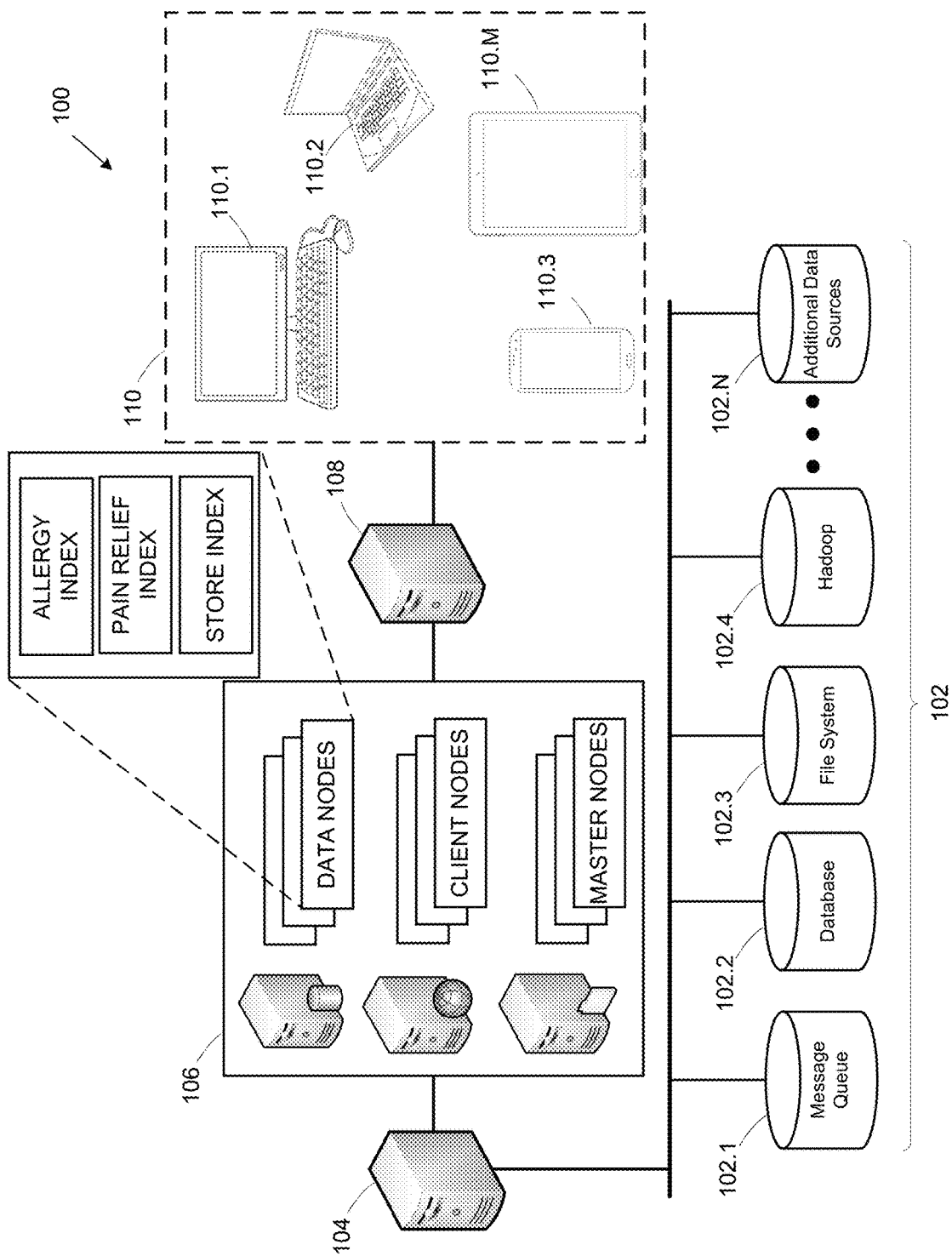
FIG. 1 is a block diagram of an example system 100 for facilitating relevancy-driven data searching, according to an embodiment.

FIG. 1 is a block diagram of an example system 100 for facilitating relevancy-driven data searching, according to an embodiment. As shown in FIG. 1, system 100 may include any suitable number N of data sources 102.1-102.N, an ingestion framework 104, an elastic search cluster 106, a core search engine 108, and any suitable number M of client computing devices 110, which may include client computing devices 110.1-110.M, for example. In an embodiment, each of data sources 102, ingestion framework 104, elastic search cluster 106, core search engine 108, and client computing devices 110 is coupled to or otherwise configured to communicate with one another, as represented in FIG. 1 by the connection between each of these components.

Although a single connection is shown in FIG. 1 between the various components of system 100, these connections may include any suitable number and/or type of wired and/or wireless links, or any suitable combination thereof. For example, one or more of the connections illustrated in FIG. 1 between data sources 102, ingestion framework 104, elastic search cluster 106, core search engine 108, and/or client computing devices 110 may be a collection of links and/or networks, such as the Internet, for example. In any event, each of data sources 102, ingestion framework 104, elastic search cluster 106, core search engine 108, and/or client computing devices 110 may communicate with one another as described herein in via any suitable techniques and/or accordance with any suitable number and/or type of communication protocols. For instance, each of data sources 102, ingestion framework 104, elastic search cluster 106, core search engine 108, and/or client computing devices 110 may communicate with one another with a series of application programming interface (API) based communications.

For example, the connection between one or more of data sources 102, ingestion framework 104, elastic search cluster 106, core search engine 108, and/or client computing devices 110 may be implemented as one or more landline, internet service provider (ISP) backbone connections, satellite links, a public switched telephone network (PSTN), one or more access points (APs), one or more macrocells, one or more femtocells, one or more local area networks (LANs), or any suitable combination of such components and/or wired, wireless, local and/or external network connections.

Generally, system 100 may be used by one or more users of client devices 110 to search for data stored in elastic search cluster 106, as further described below. Each of client computing devices 110 may be associated with a particular user or set of users. Although FIG. 1 shows a few client computing devices 110, embodiments include system 100 facilitating search queries for any suitable number of users and/or client computing devices 110. For example, embodiments include system 100 supporting searches for a number of client computing devices 110 on the order of several hundred or several thousand. Moreover, client computing devices 110 may include any suitable number and/or type of computing devices configured to facilitate a user query. For example, client computing devices 110 may include a desktop computer 110.1, a laptop computer 110.2, a smartphone 110.3, a tablet computer 110.M, etc.

In various embodiments, one or more users of client devices 110 may store information and/or instructions (e.g., software applications) to facilitate executing search queries and/or displaying search results. For example, an application may be installed on desktop computer 110.1, a laptop computer 110.2, a smartphone 110.3, and/or tablet computer 110.M, which facilitates user interaction, receives user input such as text strings, and formats the search query as part of an API structure that is recognized by core search engine 108. In other embodiments, queries may be formatted as part of the API structure recognized by core search engine 108 as part of a backend process. For example, when a user uses the retailer's website to perform searching, the web-based application and/or server (not shown) that supports the retailer's website may execute code to appropriately structure the queries for proper recognition by core search engine 108.

In any event, queries sent to core search engine 108 via one or more client computing devices 110 may include information in addition to the actual queries themselves. This may include, for example, data identifying the client device type, the IP address associated with the client device, the user's login identification, etc. Using this information, core search engine 108 may correlate each search query with a particular user profile or other unique information associated with the user and/or client device. As further discussed herein, this additional information may be used to match each query to a particular query template to execute a search via elastic search cluster 106 on a per-user or per-client basis. The user's information such as search history, search results, etc., may also be used to modify the relevancy parameters associated with the query templates and/or the logic used to match query templates to a particular user's query, as further discussed below.

To facilitate performing search queries, embodiments include client computing devices 110 being coupled to elastic search cluster 106 via core search engine 108, as further discussed below; however, for ease of explanation, the architecture and operation of elastic search cluster 106 is first introduced. In an embodiment, elastic search cluster 106 may be configured as a collection of nodes, as shown in FIG. 1. For example, elastic search cluster 106 may include one or more data nodes, client nodes, and/or master nodes. In accordance with an elastic search cluster architecture, the one or more master nodes function to control one or more portions of the cluster, or the entire cluster, depending on the cluster's overall size.

Elastic search cluster 106 may also include one or more client nodes, which function as smart load balancers that take part in some of the processing steps executed by elastic search cluster 106. In other words, the client nodes form part of the elastic search cluster 106, and they can redirect operations to the node that holds the relevant data without having to query each node. However, the client nodes typically do not store data and do not perform cluster management operations.

Data nodes, on the other hand, hold data and perform data-related operations such as create, read, update, and delete (CRUD) operations, searches, and aggregations. Elastic search cluster 106 may include additional nodes or other components not shown in FIG. 1 for purposes of brevity. For example, elastic search cluster 106 may include one or more ingest nodes, tribe nodes, coordinating nodes, etc., in accordance with any suitable type of elastic search cluster architecture.

Regardless of the precise architecture implemented by elastic search cluster 106, embodiments include elastic search cluster 106 storing one or more searchable data file indexes across one or more data nodes. For example, if the elastic search cluster 106 is implemented by a pharmacy retailer, then the data nodes may store several data file indexes associated with various products that client may wish to search. As shown in FIG. 1, data file indexes may include, for example, information regarding product information for particular products that are sold by the pharmacy such as over-the-counter allergy medication and pain-relief medication.

Additionally or alternatively, the data file indexes may include, for example, store location information such as addresses. Moreover, although only three data file indexes are shown in FIG. 1, which are associated with a single data node, embodiments include elastic search cluster 106 storing any suitable number of data file indexes across any suitable number of data nodes. In particular, given the flexibility of data storage and searching options afforded by the elastic search cluster architecture, elastic search cluster 106 may store data file indexes of any suitable type of information that a user may wish to search via client computing devices 110. For example, elastic search cluster 106 may store data file indexes representative of brands as well as product categories. Furthermore, elastic search cluster 106 may store data that is accessed by core search engine 108 to generate and/or modify query templates utilized by core search engine 108 to assign, change, and/or update specific sets of relevancy parameters used by each query template, as further discussed below.

To create the data file indexes stored in elastic search cluster 106, embodiments include ingestion framework processing data from one or more data sources 102. Once the data is "ingested" by ingestion framework 104, the data is associated with the appropriate data file index and stored in the appropriate data node(s) of elastic search cluster 106, which is also further discussed below. Therefore, embodiments include ingestion framework 104 being implemented as any suitable computing device configured to receive data from one or more data sources 102. For example, ingestion framework 104 may be implemented as one or more servers configured to execute one or more algorithms, applications, code, programs, etc., to effectuate a data ingestion process in conjunction with elastic search cluster 106. The data that is ingested by ingestion framework 104 my therefore include data relevant for particular users performing certain types of searches. As further discussed below with reference to the data sources 102, this data may include, for example, sales history data, data indicating top sellers over certain periods of time, the personalized purchase history or various users, etc. This data is then indexed as part of the data "ingestion" process and stored in elastic search cluster 106 as one or more data file indexes.

Data sources 102 may include any suitable number and/or type of data sources relevant to creating data file indexes in elastic search cluster 106 and/or for generating and/or modifying query templates. For example, data sources 102 may represent one or more internal systems utilized by the retailer such as inventory databases and/or notifications from inventory systems that a particular product is out of stock at a particular store location. To provide an illustrative example, ingestion framework 104 may ingest data and update the data file indexes in accordance with a particular schedule, such as once a week.

However, to maintain up-to-date data file indexes, retailers may also implement a batch processing operation, which is performed more often (e.g., daily or in real-time) as well. Therefore, the message queue data source 102.1 may represent one or more data sources that are associated with the occurrence of particular events that may impact the data stored in one or more data file indexes, such as an item being out of stock, for example. Upon the occurrence of such an event, ingestion framework 104 may receive any suitable type of message and/or notification identifying the type and details associated with the event via message queue data source 102.1. In some embodiments, one or more data file indexes stored in elastic search cluster 106 may include inventory information or other information that the message received from message queue data source 102.1 indicates has changed. In accordance with such embodiments, ingestion framework 104 may facilitate such changes being propagated across the one or more data file indexes as applicable. In this way, ingestion framework 104 ensures that the data file indexes have accurate and up-to-date information as they are searched.

Additionally or alternatively, ingestion framework 104 may store an indication of particular events in one or more data file indexes that are used for the generation and/or modification of query templates. This data may be accessed by search core engine 108 to update the relevancy factors associated with one or more query templates. As a result, searches executed using the updated query templates provide search results that are re-prioritized as needed. Using the out of stock inventory as an example, such embodiments may include modifying the query template such that, when applied to a received product search, the out of stock items are "pushed" or "buried" towards the bottom of the search results. Other query templates may also be adjusted to compensate for such newly received out of stock information, such as those performed for a specific brand. In this way, when certain events or conditions trigger a message being sent to the ingestion framework 104, the ingestion framework 104 may facilitate dynamically updating the data file indexes and/or the query templates to modify the returned search results as needed.

Data sources 102 may also include a data source 102.2, which may represent any suitable number of databases or other data sources that store additional types of data that is received by ingestion framework 104. Again, this data may be used to create data file indexes in elastic search cluster 106 and/or for generating and/or modifying query templates. For example, data source 102.2 may be comprised of one or more internal, external, and/or third party data sources that are used by a retailer for various business and/or financial activities. For example, data source 102.2 may include data pulled, aggregated, or otherwise accessed from various data sources indicative of inventory information, sales figures, current promotional data, various store locations and hours, etc.

Embodiments also include one or more of data sources 102 communicating with one another to facilitate various functions provided by system 100. For example, data source 102.2 may contain inventory information that is scanned or otherwise analyzed by one or more computing devices associated with message queue data source 102.1. Continuing this example, the one or more computing devices associated with message queue data source 102.1 may update the data stored in message queue data source 102.1 when it is determined that a particular item is out of stock or otherwise unavailable for purchase via analysis of data provided by data source 102.2.

Data sources 102 may further include a file system data source 102.3. File system data source 102.3 may include any suitable number and/or type of computing devices configured to provide batch-process data for ingestion framework 104. That is, the ingestion of data by ingestion framework 104 may be performed in a file-based manner. Therefore, in an embodiment, files are managed and loaded into the ingestion framework 104 as part of individual batch processes, in contrast to the event-based processes used as part of the message queue data source 102.1. Thus, file system data source 102.3 may facilitate the execution of batch processing by ingestion framework 104 to update the data file indexes stored in elastic search cluster 106 and/or the query templates generated by core search engine 108 in accordance with a particular schedule, as discussed above.

To provide an illustrative example, file system data source 102.3 may represent one or more interconnected networks, computing devices, and/or databases used to track an accurate indication of any data that is subject to change over time, and data that is relevant for creating data file indexes in elastic search cluster 106 and/or for generating and/or modifying query templates. This data may include product quantity, prices, inventory information, etc., and/or one or more other types of data received from and/or otherwise associated with the data sources 102 as discussed herein. However, file system data source 102.3 may routinely process this data as part of a batch process operation, such as daily, once a week, etc., and provide the data to ingestion framework 104 in a suitable format such that ingestion framework 104 can process the batch data in accordance with an elastic search cluster node and indexing system. Thus, ingestion framework 104 may utilize the batch data received from file system data source 102.3 to maintain accurate data across the file indexes stored in the elastic search cluster 106.

Data sources 102 may further include a Hadoop data source 102.4. In an embodiment, Hadoop data source 102.4 may represent one or more outputs of a Hadoop framework, which may be implemented as an open-source (e.g., "Apache") or a commercially available software framework used for distributed storage and processing of very large data sets. The Hadoop framework (not shown) may therefore include one or more computer clusters, modules, distributed file systems, libraries, resource-management platforms, and/or programming models.

In an embodiment, Hadoop data source 102.4 may be implemented to store, output, or otherwise provide specific calculated "insights." These insights are ingested by ingestion framework 104 and indexed by elastic search cluster 106. Hadoop frameworks are particularly useful, for example, to provide insights such as detailed correlations among data within large data sets and/or to provide a finer granularity of user behavior. For example, each user's behavior while navigating a retailer's website may be stored with that user's respective profile (e.g., in data source 102.2). Such behavior may include tracked user "clicks" through the retailer's webpage as each user searches, navigates, and purchases the retailer's items. In an embodiment, the Hadoop framework may collect or access such data sets and determine insights such as the most clicked products for specific brands, for specific regions or user segments, etc.

To provide another example, each user's search history and/or a history of search results (i.e., those produced with or without the query templates applied by core search engine 108) may be stored with each user's respective profile. In such a case, the Hadoop framework may analyze the data to generate insights such as the most searched products and/or the most popular products among several users or among specific types of users. For example, the Hadoop framework may generate insights such as the most popular items searched among certain age groups, among certain regions, among certain types of user devices, etc. Once this data is indexed into elastic search cluster 106, core search engine 108 may generate query templates and/or modify existing templates in an attempt to continuously provide the most relevant search results using these insights, in addition to or as an alternative to the other data indexed from data sources 102, as further discussed below.

Data sources 102 may further include one or more additional data sources 102.N. In an embodiment, additional data sources 102.N may represent other types of data that may not ordinarily be stored or processed by the retailer, but may still be relevant to influence the search results returned by elastic search cluster 106. In various embodiments, this data may include any suitable type of data collected, mined, or otherwise stored and associated with relevant user behavior. In various embodiments, such data may be provided upon users opting in to the collection of such data, mined from third party data providers, etc.

For example, additional data sources 102.N may include mined social media data that may be available publicly such as user posts, status updates, keywords, location information, etc. To provide additional examples, additional data sources 102.N may include metadata such as geotagged data included in shared images, a user's online purchase history collected by third party data providers, etc. Again, once this data is indexed into search cluster 106, core search engine 108 may access the data in addition to or as an alternative to other data indexed from data sources 102. Core search engine 108 may then use the accessed data to generate query templates and/or to modify existing templates, thereby providing relevant search results for data searches executed on elastic search cluster 106.

Again, embodiments include ingestion framework 104 indexing the data collected by, stored, and/or output by data sources 102. To do so, ingestion framework may include any suitable number and/or type of components to facilitate indexing data in accordance with an elastic search platform. In embodiments, ingestion framework 104 may be implemented as one or more computing devices (e.g., one or more computer servers) that execute one or more application, programs, algorithms, and/or code. For example, ingestion framework 104 may include a "logstash," which is an open source, server-side data processing pipeline that ingests data from a multitude of sources simultaneously, transforms the data, and then sends the transformed data to elastic search cluster 106.

To provide another example, ingestion framework 104 may include a bulkstash API, analyzers, and discovery plugins in accordance with an elastic search data storage and indexing model. To provide yet another example, ingestion framework 104 may store one or more base templates or "index templates," which may automatically be applied to new indices created in elastic search cluster 106. Such templates may include, for example, both settings and mappings, with a pattern template that controls if the template will be applied to the index created.

Once the data indexes are stored in elastic search cluster 106, users may submit search queries for any suitable type of data, which is then handled in accordance with the elastic search cluster protocols. Ordinarily, this search would simply be passed to elastic search cluster 106 using a particular communication protocol, such as queries sent in accordance with an API structure. The API structure defines the details or instructions used by elastic search cluster 106 to perform a particular search query and how to return the results to the client device from which the query was received.

For example, a user smartphone 110.3 may search for a particular type of product on the retailer's website, such as allergy medication, for example, by entering a keyword such as a brand name or a product description. This search may be transmitted as a query in accordance with the API structure utilized by the elastic search cluster 106 and include information, referred to herein as "data file index search parameters," which instruct the elastic search cluster 106 how to execute the search. For example, the data file index search parameters may indicate that the elastic search cluster 106 should search a particular data file index for a specific keyword and return the search results sorted in some manner (e.g., alphabetically). Therefore, without core search engine 108, elastic search cluster 106 search would execute the same search for different client computing devices 110 and return the same results with no regard to how relevant the returned search results are to each individual user or client device.

Therefore, embodiments include core search engine 108 further modifying each received query such that the search results provided by elastic search cluster 106 are provided on a per-user or per-client basis, thereby ensuring that each user views search results that are most relevant to him. With regards to what is "most relevant" to each individual user, embodiments include this being based upon various metrics that the retailer may analyze manually and/or which may be determined automatically, as further discussed below with reference to FIG. 2. For example, the retailer may decide that the most relevant search results are those that have the highest probability of resulting in a user purchasing one of the products in the search results. To this end, the retailer may analyze a history of prior search results as feedback and modify how elastic search cluster 106 executes searches for received queries over time. In this way, embodiments include the retailer periodically or dynamically fine tuning how the received queries are modified.

To do so, embodiments include core search engine 108 generating and/or storing several query templates, with each query template containing one or more relevancy factors to be applied to a received query. These query templates may function in accordance with a second API structure, thereby facilitating an API layering as queries are received. Embodiments also include core search engine 108 matching an incoming search query to a particular query template based upon instructions that may be guided by a particular set of rules, conditions, and/or logic. These template matching instructions, like the query templates themselves, may also be updated over time to ensure that each user's query is matched to the query template that provides the most relevant search results. For example, a user may be matched to a particular query template based upon the user's age group, the type of device from which the query is sent (e.g., laptop, tablet, smartphone, desktop, etc.), the user's user segment, the user's location or previous search history, etc.

The relevancy factors included in each query template may include, for example, various priority weights that, once applied to the data file index search parameters associated with a particular query, result in a modified query having new search instructions referred to herein as "relevancy search parameters." These relevancy search parameters may further instruct elastic search cluster 106 how to perform a particular search in a "weighted" manner. To provide an illustrative example, a user may use smartphone 110.3 to search for a particular type of allergy medication. The top search result that would be returned (in accordance with the data file index search parameters), however, is out of stock. But once the query is matched to a particular query template, the resulting relevancy search parameters may result in this search being weighted such that the out of stock item is not displayed in the search results, or is displayed at the bottom of the search results, as this item cannot be immediately purchased.

Further flexibility is provided through the use of fine tuning the relevancy factors within a single query template and/or generating new query templates. For example, a retailer may which to promote certain items seasonally or for a particular promotional campaign. In such a case, the relevancy factors for one or more query templates may be modified to produce the desired search results. In this way, even though the same query template may be matched to two different queries (assuming that the same matching rules or instructions are met in each case), each query template may provide different search results based upon how relevant the retailer determines the search results are at any given time.

In various embodiments, the rules and instructions for matching query templates as well as the modification and generation of query templates themselves, may be facilitated via a retailer's portal. For example, core search engine 108 may be configured to support a web-based application. Furthermore, one of client computing devices 110 may be implemented as a computing device configured to access core search engine 108 using appropriate credentials which, upon being authenticated by core search engine 108, allow a user to modify query templates, generate new templates, and define the instructions regarding how received queries are matched to query templates. In this way, the web-based portal may provide the retailer with a great deal of flexibility regarding how future searches are performed by elastic search cluster 106. Moreover, the web-based portal may provide additional functionality to allow a retailer to test or simulate multiple query template searches simultaneously. For example, the retailer may monitor business metrics such as key performance indicators (KPIs), and fine tune the relevancy factors (and/or the query template matching instructions) to continuously improve business outcomes and customer satisfaction. Examples of such a web portal are further discussed below with reference to FIGS. 5-8.

Figure 2:
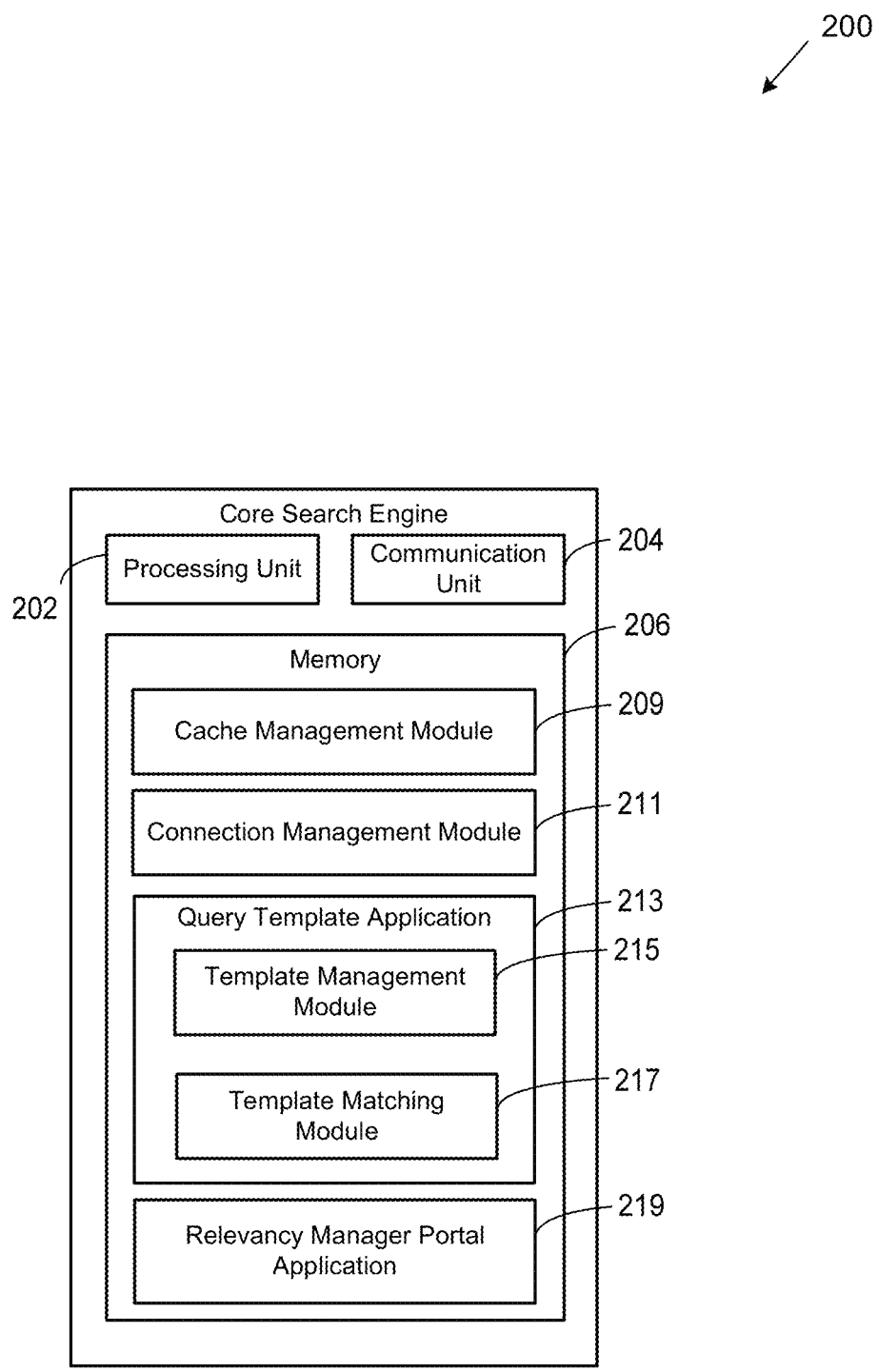
FIG. 2 is a block diagram of an example core search engine 200, according to an embodiment.

FIG. 2 is a block diagram of an example core search engine 200, according to an embodiment. In an embodiment, core search engine 200 includes a processing unit 202, a communication unit 204, and a memory unit 206. In an embodiment, core search engine 200 may be an implementation of core search engine 108, as shown in FIG. 1.

In various embodiments, processing unit 202 may be implemented as any suitable number and/or type of processors configured to process and/or analyze data received via core search engine 200 and to control and execute various tasks and/or functions of one or more components of core search engine 200. For example, processing unit 202 may be implemented as a host processor for the relevant device in which core search engine 200 is implemented. Processing unit 202 may communicate with and/or otherwise interact with one or more components of core search engine 200 (or other suitable components) to facilitate one or more functions of the embodiments as described herein.

Furthermore, processing unit 202 may be configured to communicate with one or more of communication unit 204 and/or memory unit 206 to send data to and/or to receive data from one or more of these components. For example, processing unit 202 may be configured to communicate with memory unit 210 to store data to and/or to read data from memory unit 206. In accordance with various embodiments, memory unit 206 may be a computer-readable non-transitory storage device, and may include any combination of volatile (e.g., a random access memory (RAM)), or a non-volatile memory (e.g., battery-backed RAM, FLASH, etc.). In an embodiment, memory unit 206 may be configured to store instructions executable by processing unit 202. These instructions may include machine readable instructions that, when executed by processing unit 202, causes processing unit 202 (and in turn, core search engine 200) to perform various acts.

For example, processing unit 202 may be configured, alone or via execution of instructions stored in memory unit 206, to communicate with one or more client computing devices (e.g., client computing devices 110, as shown in FIG. 1) and/or an elastic search cluster (e.g., elastic search cluster 106, as shown in FIG. 1) to perform various functions. These functions may include, for example, receiving search queries, generating and/or modifying query templates, matching the search queries to a query template, applying the relevancy factors associated with the query template to the data file index search parameters associated with the query to provide a new query with relevancy search parameters, transmitting the new query with the relevancy search parameters to the elastic search cluster, and transmitting the returned search results from the elastic search cluster to the client computing device. To provide additional examples, these functions may include supporting a web-based portal, authenticating users accessing the web-based portal, and facilitating user interaction with the web-based portal to generate new query templates, to modify existing query templates, to establish and/or modify the various instructions associated with matching query templates to queries, etc. The details associated with these functions are further discussed below.

Communication unit 204 may be configured to facilitate data communications between core search engine 200 and one or more other computing devices (e.g., client computing devices 110 and/or elastic search cluster 106, as shown in FIG. 1) components, and/or networks in accordance with any suitable number and/or type of communication protocols. Communication unit 204 may be configured to implement the same communication protocols for various types of communications or different communication protocols based upon the particular device, network, component, etc., with which core search engine 200 is communicating. In various embodiments, communication unit 204 may be implemented with any suitable combination of hardware and/or software to facilitate this functionality. For example, communication unit 204 may be implemented with any suitable number of wired and/or wireless transceivers, network interfaces, physical layers (PHY), ports, antennas, etc.

Cache management module 209 is a portion of memory unit 206 configured to store instructions, that when executed by processing unit 202, cause processing unit 202 to manage the caching of search results returned by elastic search cluster 106. These cached search results may be stored, for example, in any suitable portion of core search engine 200 (e.g., in memory unit 206) or in another suitable location external to core search engine 200. For example, instructions stored in cache management module 209 may facilitate core search engine 200 storing a history of various details associated with a number of search queries in memory unit 206. In particular, the instructions stored in cache management module 209 may be executed by processor unit 202 to store information in memory unit 206 such as a history of several search queries, the data file index search parameters associated with received queries, a history of the matched query template and that query template's relevancy factors, the relevancy search parameters associated with the search performed by elastic search cluster 106 using the relevancy search parameters, and the actual search results.

Thus, when a new search query is received, instructions stored in cache management module 209 may enable core search engine 200 to determine whether a search for that query has already been performed by comparing one or more portions of this stored information to the respective portions of the received search query and/or query template. If a match is found (e.g., one or more portions of information is found to be within a threshold tolerance of similarity between one another), the core search engine 200 may determine that the search was previously performed. In such a case, core search engine 200 may return the associated search results from those stored in memory unit 206 (or other suitable location) instead of passing the query with the relevancy search parameters to the elastic search cluster. In this way, core search engine 200 may improve the speed in which search queries are performed and help arbitrate the resources used by the elastic search cluster.

Connection management module 211 is a portion of memory unit 206 configured to store instructions, that when executed by processing unit 202, cause processing unit 202 to ensure that the connection between core search engine 200 and the elastic search cluster is managed in an efficient manner. In particular, renegotiating connections between core search engine 200 and the elastic search cluster requires each component to expend processing resources dedicated to this task. If this renegotiation is performed each time a new query is received, the overall efficiency of the system is decreased. Therefore, as core search engine 200 receives search queries, it is preferable to maintain the connection between core search engine 200 and the elastic search cluster in the event that the core search engine 200 does not have the search results already cached. In this way, the connections between core search engine 200 and the elastic search cluster may be kept alive when possible to reduce the processing overhead of the system by eliminating the need to renegotiate connections whenever possible.

Memory unit 206 may also store instructions to support various applications. In an embodiment, these applications may include a query template application 213 and a relevancy manager portal application 219. Each of these applications may include executable logic, algorithms, and/or code, which may be represented as one or more modules contained therein (as shown with respect to query template application 213). In various embodiments, query template application 213 and/or relevancy manager portal application 219 may be stored and/or executed locally, remotely, or via a combination of both.

In an embodiment, query template application 213 may operate, access, execute, or otherwise utilize instructions stored in template management module 215 and/or template matching module 217 to perform the relevant functions of the embodiments described herein.

In particular, template management module 215 facilitates core search engine 200 generating and/or modifying one or more query templates and storing the query templates in memory unit 206. This may include, for example, receiving user input used in conjunction with the portal supported by relevancy manager portal application 219. For example, users may periodically review market data and/or KPIs to identify which search results are most relevant for particular queries from certain types of users. This may include, for example, reviewing search results associated with particular metrics to identify which search results produced the most conversions.

To provide an illustrative example, market research may identify that particular brands are more popular with certain user segments than others, such as users in the age group of 18-25 versus an age group of 26-35. Thus, core search engine 200 may store an initial query template that matches queries associated with users within the 18-25 age group user segment to weight search results for these users. In doing so, core search engine 200 "boosts" or biases the search results in accordance with the matched query templates relevancy factors. For instance, the search results may be provided such that the more popular brand is returned with greater frequency and/or positioned higher in the search results.

Monitoring the market data and/or search results over time, however, may indicate that other relevant factors play a role in whether users in the 18-25 age group actually purchase an item from the returned search results. Continuing this example, when the sales data is correlated to the search results for users in the 18-25 age group, it may indicate that, among the preferred brand of products, these users are much more likely to purchase items on sale, regardless of the actual discount provided. Therefore, a user may modify the relevancy factors associated with the query template used to produce the search results to further weight products of the preferred brand items that are also on sale. Core search engine 200 may then apply the updated relevancy factors for subsequent queries to boost products that are associated with the preferred brand and are currently on sale.

In another embodiment, template management module 215 may include instructions that, when executed by processing unit 202, automatically update the relevancy factors associated with one or more query templates. For example, template management module 215 may include instructions that process data stored in the elastic search cluster, which may include insights output from the Hadoop framework as discussed above with reference to FIG. 1. Based upon these insights or other information, template management module 215 may automatically modify the query template's relevancy factors as new data is processed. For example, template management module 215 may identify user behavior such as click stream data, product meta data, sales data, promotional information, inventory, etc., and automatically update the relevancy factors associated with one or more query templates as this data is processed.

To provide an illustrative example, template management module 215 may include instructions that, when executed by processing unit 202, cause core search engine 200 to analyze inventory data (e.g., data indexed by elastic search cluster 106, as shown in FIG. 1). Upon detecting that a particular item is out of stock based upon this analysis, template management module 215 may cause core search engine 200 to automatically update the relevancy factors stored in one or more query templates to weight any out of stock items accordingly. In this way, subsequent search results can "bury" any out of stock item that would otherwise be included in the search results.

To provide another illustrative example, template management module 215 may facilitate core search engine 200 analyzing several search results associated with several received queries that were matched to the same query template. Core search engine 200 may then modify one or more relevancy factors associated with that query template based upon the search results. For instance, the search results may indicate that the same previous relevancy factors for a particular matched query template weighted qualifying promotional products by 1.5× and yielded a conversion rate for each search result between 10%-14%. Continuing this example, in such a case, template management module 215 may modify the relevancy factors to adjust the weighting from 1.5× to 2×. Template management module 215 may then cause core search engine 200 to continue to monitor search results for subsequent queries and the conversion rate associated with the updated relevancy parameters. By analyzing this data, core search engine 200 may determine whether this adjustment increased or decreased the conversion rate, and further adjust future relevancy factors accordingly based on this feedback.

In other words, the relevancy factors included in the query template may include one or more priority weights, which is further discussed below with reference to FIG. 3. Therefore, embodiments include core search engine 200 applying the relevancy factors associated with a matched query template to the data file index search parameters included in a received query. To do so, core search engine 200 may weigh the data file index search parameters such that the set of relevancy search parameters provides prioritized search results in accordance with the one or more priority weights. Thus, embodiments include instructions stored in template management module 215 facilitating core search engine 200 analyzing any suitable type of data that is relevant to modifying search results, and modifying the relevancy search parameters stored in one or more query templates in this way to affect the returned search results as desired.

In an embodiment, template matching module 217 facilitates core search engine 200 matching received queries to one of the query templates. Again, this matching process may be implemented by a set of rules, conditions, and/or logic utilized by core search engine 200, which may be represented via instructions stored in template matching module 217. Thus, as part of the matching process, core search engine 200 may consider any suitable number and/or type of characteristics that are relevant to providing specific and relevant search results on a per-user basis. For example, the characteristics may include user and/or client characteristics such as a user group, an age group, a location associated with the user (e.g., the user's address on file in her profile), a location of the client computing device from which the query was received, etc. To provide additional examples, the characteristics may include a type of client computing device (e.g., smartphone, tablet, or desktop), the context of a particular query, the user's search history, etc.

To provide an illustrative example, assume again that market research has identified that particular brands are more popular with certain user segments than others, such as an age group of user 18-25 versus an age group of 26-35. Thus, core search engine 200 may store an initial query template that matches queries associated with users within the 18-25 user segment to weight search results for these users, thereby providing search results with the more popular brand being returned with greater frequency and/or positioned higher in the search results than it is for users in the 26-35 age group. Monitoring the market data and/or search results over time, however, may indicate that the same search results for users between 22-25 yields a much better percentage of conversions as compared to users in an 18-21 age group. In other words, the original matching conditions may apply all users within the age group of 18-25 to the same query template, while an analysis of these search results over time may indicate that the search results are actually more relevant to a sub-group of ages within this user segment.

Continuing this example, template matching module 217 may include instructions that, when executed by processing unit 202, facilitate core search engine 200 generating a new query template for users in the age group of 18-21 (e.g., via execution of instructions stored in template management module 215). Additionally or alternatively, core search engine 200 may update the rules, conditions, and/or logic for matching users in the age group of 18-21 so that a different query template is matched for these users. In any event, core search engine 200 may match subsequent queries from users within the age group of 18-21 to a different query template than subsequent queries from users within the age group of 22-25.

Again, core search engine 200 may analyze the various data collected by the ingestion framework 104, as discussed above with reference to FIG. 1. As part of this process, core engine 200 may update and/or add new query templates and/or query template matching instructions as indicated by the ingested data. For example, core search engine 200 may identify insights provided via the Hadoop framework as discussed above with reference to FIG. 1 and modify how query templates are matched and/or how relevancy factors in query templates are applied using these insights. As a result, core search engine 200 may identify specific and granular correlations over time to improve the relevancy of search results for various users. In doing so, core search 200 may continually and dynamically update the search results provided to each user based upon correlations or other information indicating which set of results are most relevant to each individual user.

Relevancy manager portal application 219 may support a web-based or other suitable application to facilitate user-interaction with core search engine 200. In particular, relevancy manager portal application 219 may support a portal that allows users to login, view, modify, and/or execute various components of core search 200 that affect how searches are performed for different users. For example, the portal supported by relevancy manager portal application 219 may allow users to generate new matching instructions defining how query templates are matched to specific queries. To provide another example, the portal supported by relevancy manager portal application 219 may allow users to change the relevancy factors associated with one or more stored query templates or to generate new query templates. In some embodiments, such actions may be performed manually by a user based upon particular key performance indicators (KPIs) or other metrics that drive the search results to be the most relevant for the user and, hence, the most desirable for the retailer. In other embodiments, these actions may be automatically performed by core search engine 200. For example, core search engine 200 may be programmed or otherwise configured to monitor certain search feedback metrics over time (e.g., search results, conversion percentages, etc.) and to modify matching instructions and/or template relevancy factors based upon this feedback. Additional details regarding the portal supported by relevancy manager portal application 219 are further provided below with reference to FIGS. 5-8.

Figure 3:
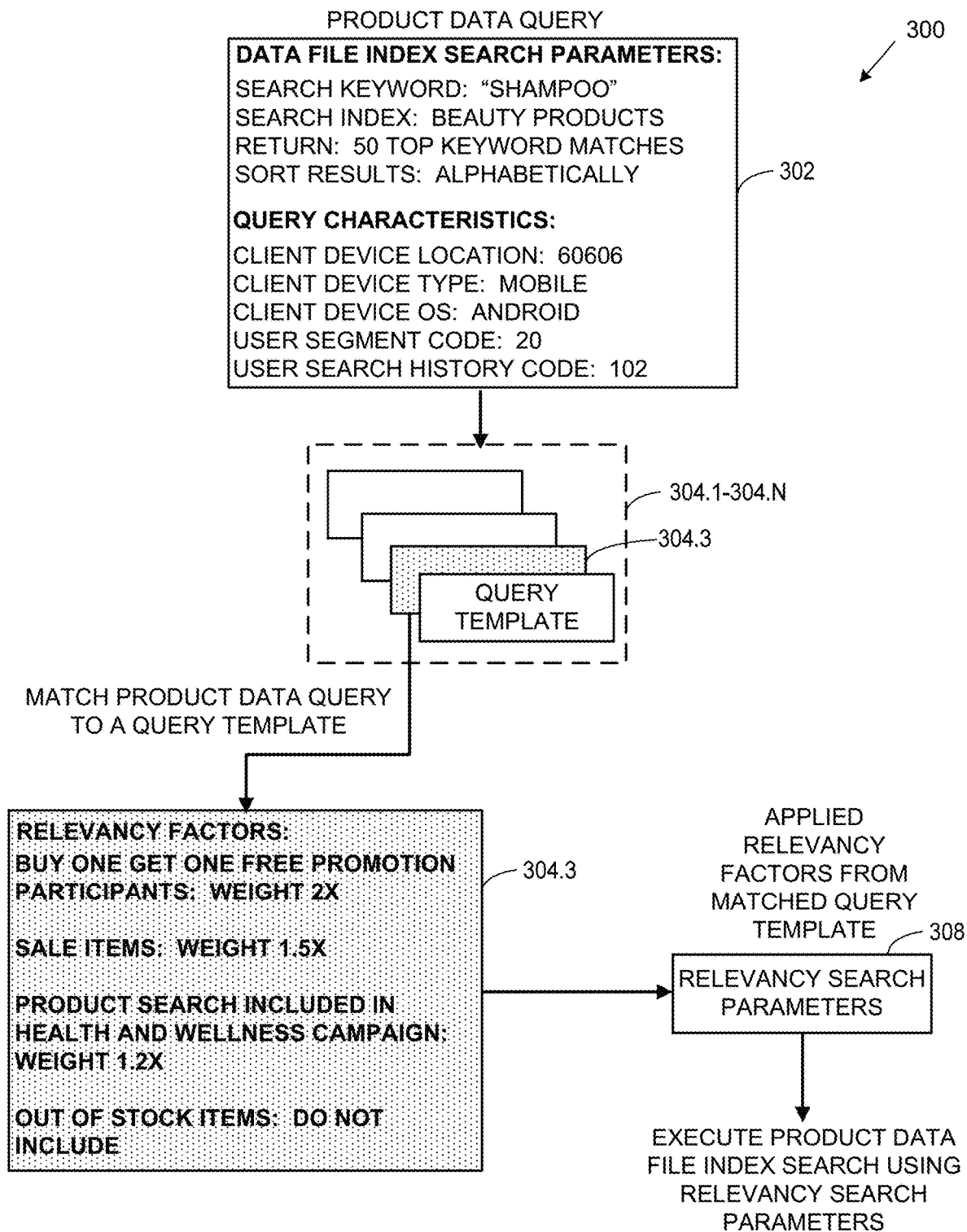
FIG. 3 is a block diagram illustrating an example relevancy search process 300, according to an embodiment.

FIG. 3 is a block diagram illustrating an example relevancy search process 300, according to an embodiment. In an embodiment, search process 300 may begin when core search engine 200 receives a query 302 from a client computing device. The example shown in FIG. 3 is for a product query, which may include a full or partial test string for a particular product or brand, for example.

In the particular example shown in FIG. 3, the product search is for a full text string "shampoo," and thus may include a text string in accordance with this search. However, embodiments include search process 300 being implemented for any suitable type of full or partial search used in conjunction with a search platform, such as an elastic search cluster, for example, as described herein. In other words, given the flexibility afforded by the elastic search cluster platform that query templates may be matched to queries on a full or partial match basis. For example, given the speed in which the elastic search cluster may execute searches, partial queries may be processed such that search results may be presented on a partial match basis. For example, instead of searching "shampoo," a user may simply type in a query for "sham," which is searched as soon as the API structure recognizes that this is a partial match to an existing set of keywords. In this way, system 100 may provide search results in real-time or near real time as partial queries are received and processed.

As shown in FIG. 3, the query 302 may contain various data file index search parameters as identified by the API structure used for the query 302. These data file index search parameters may indicate the search string (partial or full) as well as additional instructions regarding how the search should be executed, and how the search results should be returned for display on the client computing device. In this example, the data file index search parameters include the full text string "shampoo," an indication to search the data fie index containing beauty products, and instructions for the elastic search cluster to return the top 50 keyword matches in alphabetical order. In other words, the data file index search parameters indicate how the search would be performed if the functionality of core search engine 200 was not implemented.

However, embodiments include the core search engine 200 matching the query 302 to a particular query template based upon one or more query characteristics. For instance, as shown in FIG. 3, the query 302 is associated with several characteristics such as the location of the client device (e.g., a zip code), the type of client device (mobile), the client device operating system (Android), and a user segment (20) and history (102) code. With regards to the user segment and history codes, these may represent one or more user characteristics that are relevant to matching a user's query to a particular query template. For example, user segment code 20 may correspond to a particular age bracket of users, while user history code 102 may correspond to a particular pattern of search metrics that have been correlated to a particular type of user. For example, the Hadoop framework may identify particular insights from several users that indicate a probability of each type of user purchasing various types of products. Thus, user search history code 120 may correspond to one of these insights that correlates this particular user's search history for query 302 to a particular matching metric. For example, user search history code 120 may be associated with users that have a 14% chance of purchasing beauty products, which may influence the query template that is matched to the user.

Regarding the query template matching process, core search engine 200 may store any suitable number N of query templates 304.1-304.N, as discussed above with reference to FIG. 2. Embodiments include the query 302 being matched to one of query templates 304.1-304.N based upon the various query characteristics. For example, query template 304.3 may be associated with similar query characteristics as those shown in FIG. 3 for query 302. In various embodiments, this matching process may be implemented via any suitable rules, conditions, and/or logic. For example, each query characteristic may be associated with a particular weight or priority, such that certain query characteristics may be emphasized over others when identifying a query template match. To provide another example, query characteristics may be additionally or alternatively quantified and matched to a respective range of characteristics associated with each query template. For example, if user search history code 102 corresponds to users that have a 14% chance of purchasing beauty product and the query template instructions specify that this characteristic should be emphasized more than others, then a query template may be selected from those that have a probability of purchase within this designated range.

In any event, once a query template is matched to a particular query (query template 304.3 in this case) then core search engine 200 may apply the relevancy search parameters associated with query template 304.3 to the data file index search parameters associated with the query 302. As a result, core search engine 200 generates a set of relevancy search parameters 308. For example, as shown in FIG. 3, query template 304.3 includes relevancy factors that indicate buy one get one free promotional products should be weighted twice that of other matching shampoo products. Furthermore, shampoo products that are on sale should be weighted by 1.5×, while any shampoo products that qualify for the current health and wellness campaign should be weighted by 1.2×. Finally, query template 304.3 also indicates that out of stock items should not be included in the search results.

Once these relevancy factors are applied to the data file index search parameters associated with query 302, the resulting relevancy search parameters instruct the elastic search cluster how to perform the search for shampoo within the construct of these conditions. Thus, the returned search results will reflect the prioritization of relevancy factors specified by the matched query template 304.3, which was matched to the query 302 based upon desired characteristics of query 302. In this way, the user may be provided with search results for the query 302 that are most relevant to the user based upon how the query template 304.3 was matched to the query 302 and the relevancy factors selected for query template 304.3.

Figure 4:
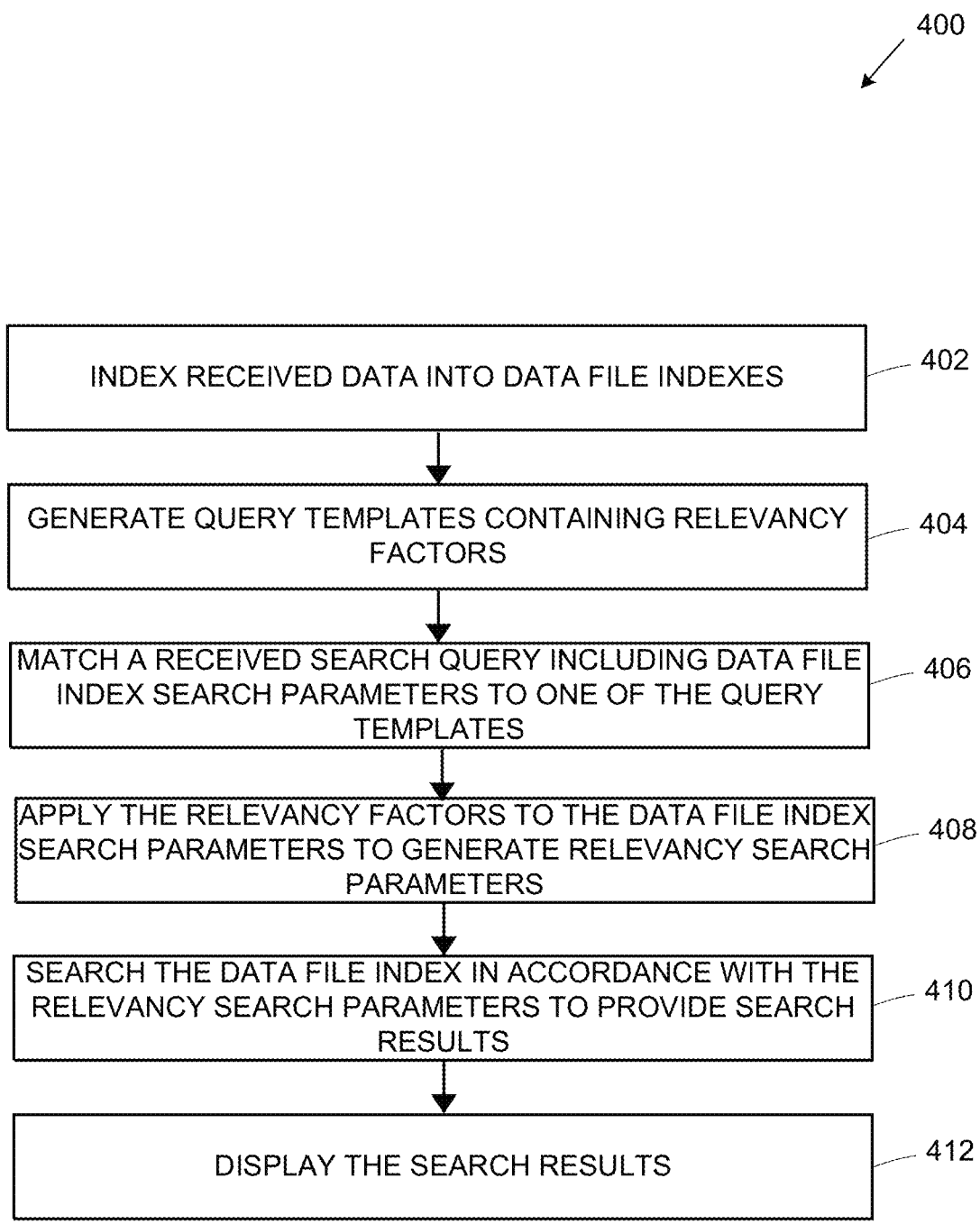
FIG. 4 is a flow chart showing an exemplary method 400 for a relevancy search process, according to an embodiment.

FIG. 4 is a flow chart showing an exemplary method 400 for a relevancy search process, according to an embodiment. In various embodiments, one or more portions of method 400 may be implemented by one or more suitable computing devices, with any (or all) portions of method 400 being implemented on a single computing device or a combination of computing devices. For example, one or more portions of method 400 may be performed via an ingestion framework (e.g., ingestion framework 104, as shown in FIG. 1), via a core search engine (e.g., core search engine 200, as shown in FIG. 2), via one or more elastic search clusters (e.g., elastic search cluster 106, as shown in FIG. 1), and/or via one or more client computing devices (e.g., client computing devices 110, as shown in FIG. 1).

Method 400 may start when one or more processors index received data into data file indexes (block 402). This may include, for example, ingestion framework 102 ingesting the data from one or more of data sources 102, as discussed above with reference to FIG. 1. These data file indexes may be stored, for example, across one or more nodes of the elastic search cluster 106 (block 402).

Method 400 may include one or more processors generating query templates containing relevancy factors (block 404). This may include, for example, core search engine 200 generating one or more query templates based upon user input received via a relevancy management portal (block 404). This may also include, for example, core search engine 200 automatically generating one or more query templates based upon an analysis of collected data stored in elastic search cluster 106, as discussed above with reference to FIGS. 1 and 2 (block 404).

Method 400 may include one or more processors matching a received search query, which includes data file index search parameters, to one of the stored query templates (block 406). This may include, for example, core search engine 200 determining a matching query template based upon one or more query characteristics, as discussed herein with reference to FIGS. 2 and 3 (block 406).

Method 400 may include one or more processors applying the relevancy factors from the matched query template to the data file index search parameters to generate relevancy search parameters (block 408). This may include, for example, modifying the data file index search parameters with various priority weights as indicated by the relevancy factors in accordance with a suitable API structure, as discussed above with reference to FIGS. 1-3 (block 408).

Method 400 may include one or more processors searching the data file index in accordance with the relevancy search parameters to provide search results (block 410). This may include, for example, the elastic search cluster receiving the query with relevancy search parameters from the core search engine 200, and executing a search in accordance with the instructions contained in the query (block 410).

Method 400 may include one or more processors displaying the search results (block 412). This may include, for example, the core search engine receiving the search results from the elastic search engine and transmitting the search results to the client computing device from which the query was received. Upon receiving the search results, the client computing device may display these results via any suitable display (block 412).

As discussed herein, the process of tailoring search results over time may be performed manually, automatically, or semi-automatically. To do so, the query templates, as well as the matching rules and/or logic used to match query templates to particular searches, may be modified over time. To provide an example with respect to the components described in FIGS. 1-2, a user may access a relevancy manager portal from one or more client computing devices 110 that is supported by relevancy manager portal application 219, which may be executed via core search engine 200. The relevancy manager portal provide users with various utilities such as creating new query templates, modifying existing query templates, establishing new query template matching instructions, modifying existing query template matching instructions, simultaneously comparing search results from searches using different query templates, testing new query templates, etc. In this way, embodiments include the relevancy manager portal allowing a retailer or other user who has an interest in the search results to test various search result outcomes before these changes are implemented or "go live." In other words, the relevancy manager portal provides a simulated "sandbox" environment whereby various modifications can be introduced, giving users the option to select the most favorable results for actual use. Some example screenshots of the relevancy manager portal are shown and described with reference to FIGS. 5-8, which support these aforementioned utilities. It will be understood that the screenshots shown in FIGS. 5-8 are one example of how the relevancy manager portal may be implemented. However, embodiments include the relevancy manager portal including any suitable number and/or type of interactive icons, graphics, text, indicia, and/or alternate or additional controls to perform the various functions associated with the embodiments as described herein.

FIG. 5 is an example screenshot 500 of a relevancy management home screen, in accordance with an embodiment. As shown in FIG. 5, screenshot 500 includes a navigation bar 502, a menu 504, a query template list 506, and a command portion 508.

Navigation bar 502 may include one or more interactive icons that are selectable by a user to cause the relevancy manager portal to navigate to the appropriate area within the web-based application. Users may login to the relevancy manager portal by selecting the "user" icon, and thus each user may use the relevancy manager portal in accordance with his login profile, saving any tests, changes, etc., under this profile information. In an embodiment, menu 504 may duplicate some of the functionality provided by navigation bar 502 and provide a user with additional options. For example, a user may select "workbench" from menu 504, which may provide a drop-down list of different workbench related items such as executing a simulated search (as further discussed with reference to FIG. 6), modifying query template relevancy factors, etc. These additional drop-down options are not shown in FIG. 5 for purposes of brevity.

Furthermore, a user may select "compare instances" from either navigation bar 502 or menu 504 to navigate to a portion of the portal in which simultaneously search results for two or more different query templates may be compared, as shown and discussed below with reference to FIG. 7. A user may likewise select "workbench" from either navigation bar 502 or menu 504 to navigate to a portion of the portal to perform target searches, as discussed with reference to FIG. 8. Moreover, a user may select "home" from navigation bar 502 to return to the view shown in FIG. 5 from another portion of the relevancy portal (e.g., those shown in FIGS. 6-8).

In embodiments, query template list 506 may include a list of query templates and information associated with each one. For example, a name of each query template may be listed along with information such as the status (i.e., whether the query template is live), when the query template was created and last updated, and the user who created it. A user may modify the details associated with any one of these listed query templates by selecting the query template in query template list 506. Alternatively, a user may select the desired query template from a drop-down list that is provided upon the user selecting the "templates" option from menu 504, which may produce a list of query templates by name (e.g., sorted alphabetically by name, date, etc.). A user may also add a new query template or import a query template from another storage medium by selecting the appropriate option from portion 508. The details associated with the modification of the query templates using the relevancy manager portal is not shown for purposes of brevity.

Figure 6:
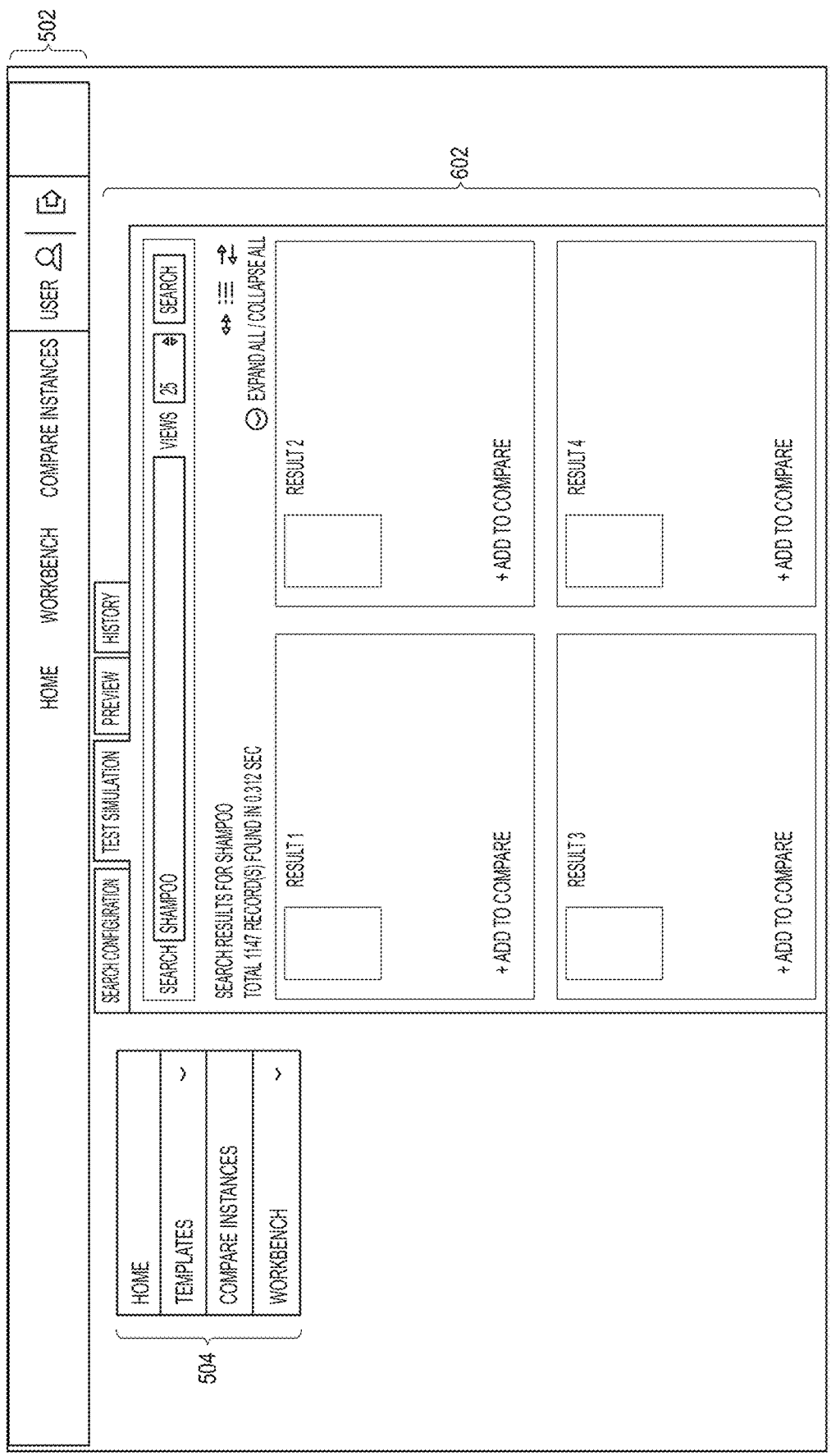
FIG. 6 is an example screenshot 600 of a relevancy management search simulation page, in accordance with an embodiment.

FIG. 6 is an example screenshot 600 of a relevancy management search simulation page, in accordance with an embodiment. As shown in FIG. 6, screenshot 600 includes the navigation bar 502 and the menu 504, as shown in FIG. 5. However, screenshot 600 also includes a portion 602, which indicates the search results for a specific search that is executed using a selected query template. In an embodiment, portion 602 may be presented upon a user selecting the "workbench" option from either navigation bar 502 or menu 504, and then selecting the "test simulation" tab from portion 602. In this way, users can first simulate searches for one or more query templates to determine which search results are most relevant in a controlled manner before activating these query templates for live use.

Figure 7:
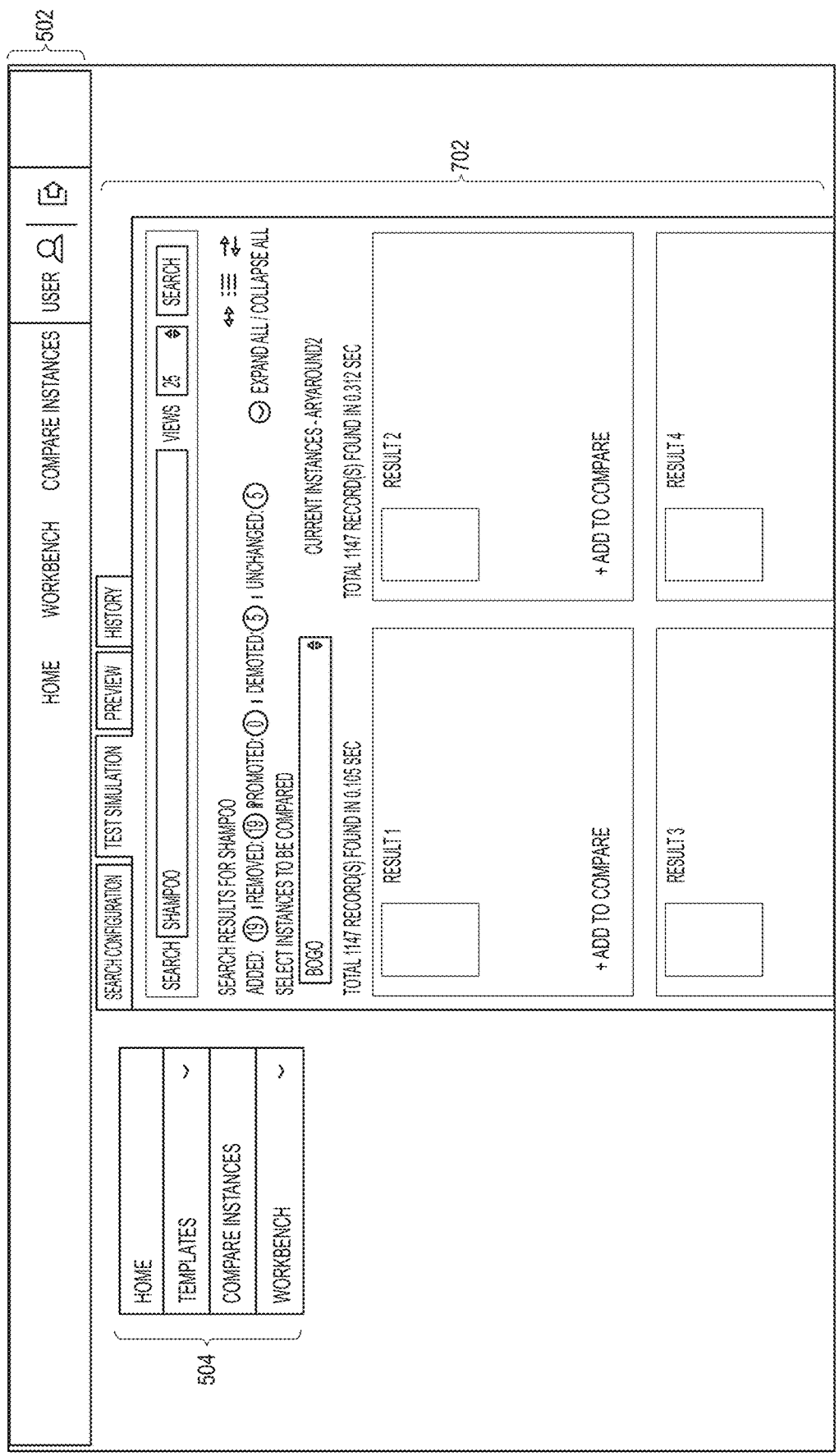
FIG. 7 is an example screenshot 700 of a relevancy management search comparison screen, in accordance with an embodiment.

FIG. 7 is an example screenshot 700 of a relevancy management search comparison screen, in accordance with an embodiment. As shown in FIG. 7, screenshot 700 includes the navigation bar 502 and the menu 504, as shown in FIG. 5. However, screenshot 700 also includes a portion 702, which indicates two different simulated search results executed from two different query templates. In an embodiment, portion 702 may be displayed upon a user selecting the "compare instances" option from either navigation bar 502 or menu 504, and specifying the query templates for comparison and the search that is to be performed (e.g., "shampoo"). Alternatively, portion 702 may be presented upon a user selecting the "workbench" option from either navigation bar 502 or menu 504, selecting the "test simulation" tab from portion 602 to execute two or more query template search tests (as shown in FIG. 6), and then selecting "add to compare" from the search results associated with those query templates.

In this way, the relevancy manager portal allows users to simulate searches with different query templates simultaneously and to compare the search results from each one side-by-side. Furthermore, the relevancy manager portal allows a user to view various metrics (e.g., number of returned products, the order of the returned search results, the time taken to perform the search, etc.) associated with those searches. Thus, users can first simulate searches for one or more query templates to determine which search results are most relevant. Users can then choose the most relevant query templates to be used for live searches from the simulations, which are performed in a controlled and contained manner.

FIG. 8 is an example screenshot 800 of a relevancy management target search page, in accordance with an embodiment. As shown in FIG. 8, screenshot 800 includes the navigation bar 502 and the menu 504, as shown in FIG. 5. However, screenshot 800 also includes a portion 802, which provides an interface that allows users to determine various metrics associated with specific queries. In an embodiment, portion 802 may be displayed upon a user selecting the "workbench" option from either navigation bar 502 or menu 504.

A user may then interact with portion 802 to search for matching queries by entering a keyword in the "search keyword" box. The relevancy manager portal may then present the query templates associated with particular keyword searches. For example, a user may search for "baby" to view each search associated with this keyword. As shown in FIG. 8, the details associated with each search may also be shown, such as the top products returned for each search, whether the query template for the search is active or inactive, etc. Furthermore, portion 802 may indicate how the relevancy factors associated with each query template influences the search results. For example, the "no. of products altered" may be a useful metric that demonstrates how each query template modifies how the search would otherwise be performed. Thus, the relevancy manager portal may be useful for users to quickly and conveniently view a summary of how searches are performed for particular products.

TECHNICAL ADVANTAGES

The embodiments described herein are directed to an improvement to computer functionality, and improve the functioning of conventional computers. Specifically, the embodiments described herein may be implemented as part of a computer network architecture, and thus address and solve issues of a technical nature that are necessarily rooted in computer technology. For instance, embodiments provide the most relevant searches on a per-user basis, and thus eliminate the need for users to execute several searches to find a desired product. In doing so, the embodiments overcome issues associated with searching databases by alleviating network congestion used to communicate with elastic search clusters. Because networks are designed and installed with data traffic considerations as a considerable driving factor, the embodiments also help address issues related to network bandwidth usage.

Furthermore, by optimizing how search results are provided, embodiments described herein function to improve the efficiency of search engine technology by reducing processing overhead that would otherwise need to be expended. In other words, because the elastic search cluster executes a fewer number of searches as a direct result of the improvements to the technology provided by the embodiments described herein, the elastic search cluster uses less processes resources and power than would otherwise be possible.

Still further, regardless of the type of computing devices that are used to implement the embodiments described herein, the process of query template matching and the application of relevancy factors to a query constitute an improvement over traditional search technologies. In particular, the rules, logic, and/or conditions specified herein, in and of themselves, constitute an improvement to how data searches are typically performed, resulting in relevant search results that are provided on a per-user and/or a per client device basis.

ADDITIONAL CONSIDERATIONS

Although the embodiments are described herein mainly with regard to an elastic search cluster, these embodiments are equally applicable to any suitable type of data searching system, which may or may not use elastic search clusters. For example, the embodiments described herein may be applied to database searches in accordance with any suitable API structure that is used for those searches.

As used herein, the term "pharmacy" may include, for example, a single outlet or a plurality of outlets affiliated with one or more entities that are licensed to dispense prescribed pharmaceutical products such as drugs, medicaments, durable medical equipment, etc. The one or more entities may be located, for example, in geographic locations separate from one another, in different areas of the same city, or in different states, countries, etc. The pharmacy outlets may include, for example, one or more of a conventional retail store, space within a location operated by another commercial or not-for-profit entity (e.g., within a discount store, hospital, school, nursing home, etc.), an outlet in proximity with a warehouse or distribution center, a call-in pharmacy, a long-term care pharmacy, a workplace/on-site pharmacy, a specialty pharmacy, etc. The pharmacy may be commercial or not-for-profit, and may provide or vend other products in addition to the prescribed pharmaceutical products.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method, comprising:
    receiving, by one or more processors of an ingestion framework, data from a plurality of data sources;
    indexing, by the one or more processors of the ingestion framework, the data received from the plurality of data sources to create data file indexes that are stored across several data nodes within an elastic search cluster;
    generating, by one or more processors of a core search computing device, a plurality of query templates based on the received data, each query template from among the plurality of query templates containing one or more relevancy factors to be applied to a received query for searching a data file index from among the plurality of data file indexes;
    receiving, by one or more processors of the core search computing device, a first query from a client device for data stored in one of the plurality of data file indexes, the first query structured in accordance with a first application programming interface (API) and including data file index search parameters;
    matching, by one or more processors of the core search computing device, the received first query to one of the plurality of query templates;
    applying, by one or more processors of the core search computing device, the relevancy factors associated with the matched query template to the data file index search parameters to define a set of relevancy search parameters, the relevancy factors defined by other than a person associated with the first query;
    forming, by the one or more processors of the core search computing device, a second different query including the set of relevancy search parameters, the second query structured in accordance with a second different API;
    searching, by one or more processors of the elastic search cluster, the data file index in accordance with the second query to provide search results; and
    displaying, by one or more processors of the client device, the search results.

2. The computer-implemented method of claim 1, further comprising:
    identifying, by one or more processors of the core search computing device, one or more client characteristics associated with the client device,
    wherein the act of matching the received first query to one of the plurality of query templates includes matching the received first query to query templates based upon the one or more client characteristics.

3. The computer-implemented method of claim 2, wherein the one or more client characteristics include a location and a type of client device.

4. The computer-implemented method of claim 1, further comprising:
    identifying, by one or more processors of the core search computing device, a plurality of search results associated with several received queries that were matched to a same query template from among the plurality of query templates; and
    modifying, by one or more processors of the core search computing device, the one or more relevancy factors of the same query template based upon the plurality of search results.

5. The computer-implemented method of claim 1, wherein the relevancy factors included in the matched query template include a plurality of priority weights, and
    wherein the act of applying the relevancy factors associated with the matched query template to the data file index search parameters includes weighting the data file index search parameters such that the set of relevancy search parameters provide prioritized search results in accordance with the plurality of priority weights.

6. The computer-implemented method of claim 1, wherein the different types of data contained in the plurality of data file indexes include retail product data and store location data.

7. The computer-implemented method of claim 1, wherein the received first query is for a product, and further comprising:
    receiving, by one or more processors of the ingestion framework, a notification included in the data received from the plurality of data sources that the product is out of stock; and
    modifying, by one or more processors of the core search computing device, one or more relevancy factors associated with the query template that matches the received first query in response to the received notification to provide modified relevancy factors that yield search results that reflect a reduced prioritization of the out of stock product as compared to search results yielded using the relevancy search parameters.

8. An elastic search cluster system, comprising:
    an ingestion framework configured to index data received from a plurality of data sources to create data file indexes that are stored across several data nodes within an elastic search cluster;
    a core search computing device configured to (i) generate a plurality of query templates based on the received data, each query template from among the plurality of query templates containing one or more relevancy factors to be applied to a received query for searching a data file index from among the plurality of data file indexes, (ii) receive a first query from a client device for data stored in a file index from among the plurality of data file indexes, the first query structured in accordance with a first application programming interface (API) and including data file index search parameters, (iii) match the received first query to one of the plurality of query templates, (iv) apply the relevancy factors associated with the matched query template to the data file index search parameters to define a set of relevancy search parameters, the relevancy factors defined by other than a person associated with the first query, (v) forming a second different query including the set of relevancy search parameters, the second query structured in accordance with a second different API; and an elastic search cluster configured to search the data file index in accordance with the second query, and to send the search results to the client device.

9. The system of claim 8, wherein the core search computing device is further configured to identify one or more client characteristics associated with the client device, and to match the received first query to one of the plurality of query templates based upon the one or more client characteristics.

10. The system of claim 9, wherein the one or more client characteristics include a location of the client device and a type of the client device.

11. The system of claim 8, wherein the core search computing device is further configured to identify a plurality of search results associated with several received queries that were matched to the same query template from among the plurality of query templates, and to modify the one or more relevancy factors of the same query template based upon the plurality of search results.

12. The system of claim 8, wherein the relevancy factors included in the matched query template include a plurality of priority weights, and wherein the core search computing device is further configured to apply the relevancy factors associated with the matched query template to the data file index search parameters by weighting the data file index search parameters such that the set of relevancy search parameters provide prioritized search results in accordance with the plurality of priority weights.

13. The system of claim 8, wherein the different types of data contained in the plurality of data file indexes include retail product data and store location data.

14. The system of claim 8, wherein:
the received first query is for a product,
the data received from the plurality of data sources includes a notification that the product is out of stock, and
the core search computing device is further configured to modify, in response to the received notification, one or more relevancy factors associated with a query template that matches the received first query to provide modified relevancy factors that yield search results that reflect a reduced prioritization of the out of stock product as compared to search results yielded using the relevancy search parameters.

15. A non-transitory, tangible computer-readable medium storing machine readable instructions that, when executed by a processor, cause the processor to:
generate a plurality of query templates, each of the query templates based on the received data, each query template containing one or more relevancy factors to be applied to a received query for searching a data file index from among a plurality of data file indexes, the data file indexes being based upon data received from a plurality of data sources and being stored across several data nodes within an elastic search cluster;
receive a first query from a client device for data stored in a file index from among the plurality of data file indexes, the first query structured in accordance with a first application programming interface (API) and including data file index search parameters;
match the received query to one of the plurality of query templates;
apply the relevancy factors associated with the matched query template to the data file index search parameters to define a set of relevancy search parameters that form a second different query structured in accordance with a second API, an elastic search cluster to search the data file index in accordance with the second query to provide search results, the relevancy factors defined by other than a person associated with the first query; and
send the search results to the client device to be displayed.

16. The non-transitory, tangible computer-readable medium storing machine readable instructions of claim 15, further including instructions that, when executed the processor, cause the processor to identify one or more client characteristics associated with the client device, and to match the received first query to the one of the plurality of query templates based upon the one or more client characteristics.

17. The non-transitory, tangible computer-readable medium storing machine readable instructions of claim 16, wherein the one or more client characteristics include a location of the client device and a type of the client device.

18. The non-transitory, tangible computer-readable medium storing machine readable instructions of claim 15, further including instructions that, when executed the processor, cause the processor to identify a plurality of search results associated with several received queries that have been matched to the same query template from among the plurality of query templates, and to modify the one or more relevancy factors of the same query template based upon the plurality of search results.

19. The non-transitory, tangible computer-readable medium storing machine readable instructions of claim 15, wherein the relevancy factors included in the matched query template include a plurality of priority weights, and further including instructions that, when executed the processor, cause the processor to apply the relevancy factors associated with the matched query template to the data file index search parameters by weighting the data file index search parameters such that the set of relevancy search parameters provide prioritized search results in accordance with the plurality of priority weights.

20. The non-transitory, tangible computer-readable medium storing machine readable instructions of claim 15, wherein the received first query is for a product and the data received from the plurality of data sources includes a notification that the product is out of stock, and further including instructions that, when executed the processor, cause the processor to, in response to the received notification, modify one or more relevancy factors associated with the query template that matches the received first query to provide modified relevancy factors that yield search results that reflect a reduced prioritization of the out of stock product as compared to search results yielded using the relevancy search parameters.

* * * * *